United States Patent
Shukla et al.

(10) Patent No.: US 9,060,111 B2
(45) Date of Patent: Jun. 16, 2015

(54) ELECTRONIC DEVICE WITH COMPACT CAMERA MODULE

(75) Inventors: Ashutosh Y. Shukla, Santa Clara, CA (US); Kenta K. Williams, Sunnyvale, CA (US); Steven Webster, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 13/605,000

(22) Filed: Sep. 6, 2012

(65) Prior Publication Data

US 2014/0063302 A1     Mar. 6, 2014

(51) Int. Cl.
*H04N 5/335*      (2011.01)
*H01L 31/0232*   (2014.01)
*H01R 13/648*    (2006.01)
*H04N 5/225*      (2006.01)

(52) U.S. Cl.
CPC ........... *H04N 5/2254* (2013.01); *H04N 5/2257* (2013.01)

(58) Field of Classification Search
USPC .............. 348/294, 345, 208.1, 239, 335, 340, 348/373, 374; 257/680, 625, 432–434, 675, 257/659, E23.045, 422, 423, 414, 421; 396/55, 133, 144, 529, 535; 359/811, 359/819, 823, 824; 439/607.01–607.59; 438/122, 502, 3, 73; 349/811, 819, 349/823, 824
See application file for complete search history.

(56) References Cited

U.S. PATENT DOCUMENTS

| | | | |
|---|---|---|---|
| 5,673,083 A * | 9/1997 | Izumi et al. | 348/340 |
| 6,476,417 B2 * | 11/2002 | Honda et al. | 257/59 |
| 6,885,107 B2 | 4/2005 | Kinsman | |
| 7,603,150 B2 | 10/2009 | Takahashi | |
| 7,714,931 B2 * | 5/2010 | Singh et al. | 348/374 |
| 8,014,841 B2 | 9/2011 | Joo et al. | |
| 2002/0057468 A1 * | 5/2002 | Segawa et al. | 358/509 |
| 2007/0292127 A1 | 12/2007 | Kuhmann et al. | |
| 2010/0328525 A1 * | 12/2010 | Lee et al. | 348/374 |
| 2011/0103782 A1 * | 5/2011 | Tsuruta et al. | 396/55 |
| 2011/0194023 A1 * | 8/2011 | Tam et al. | 348/374 |
| 2011/0255000 A1 | 10/2011 | Weber et al. | |
| 2012/0176277 A1 | 7/2012 | Malek et al. | |

* cited by examiner

*Primary Examiner* — Lin Ye
*Assistant Examiner* — Marly Camargo
(74) *Attorney, Agent, or Firm* — Treyz Law Group; Kendall P. Woodruff

(57) ABSTRACT

A compact electronic device may include a camera module having an image sensor. The image sensor may be controlled by storage and processing circuitry to capture image data from received light. The camera module may include a substrate having front and rear surfaces. The image sensor may be mounted to the rear surface of the substrate. The substrate may include optical focusing structures on the front surface of the substrate that focus light through an opening in the substrate to the image sensor. A flex circuit may be used to convey signals between the camera module and other electronic device components. The flex circuit may be mounted to the front surface of the camera module substrate to help reduce total height of the camera module. The flex circuit may be mounted to an extended portion of the substrate or may be mounted to surround the periphery of the image sensor.

22 Claims, 9 Drawing Sheets

ELECTRONIC DEVICE WITH COMPACT CAMERA MODULE

BACKGROUND

This relates generally to electronic devices, and more particularly, electronic devices having camera modules with image sensors.

Electronic devices such as portable computers, tablet computers, and cellular telephones are often provided with camera modules. The camera modules include digital image sensors and additional structures such as a lens and autofocus structures. A digital image sensor is typically mounted to a camera module substrate.

It may be challenging to provide camera modules that are sufficiently slim. For example, signal routing structures for conveying captured image signals from the image sensor are often mounted to the underside of a camera module substrate. The signal routing structures may add undesired size to an electronic device. Particularly in compact devices such as cellular telephones, tablet computers, portable computers, and other such electronic devices in which space is at a premium, it may not be acceptable to use bulky conventional camera modules.

It would therefore be desirable to be able to provide improved ways of forming camera modules in electronic devices.

SUMMARY

A compact electronic device may include an electronic device housing. The electronic device housing may enclose components such as storage and processing circuitry and a camera module. The storage and processing circuitry may be formed on a printed circuit substrate. The camera module may include an image sensor that receives light through a transparent window in the electronic device housing. The image sensor may be controlled by the storage and processing circuitry to capture image data from the received light.

The camera module may include a camera module substrate having front and rear surfaces. The camera module substrate may be a ceramic substrate such as a high temperature co-fired ceramic substrate. The image sensor may be mounted to the rear surface of the camera module substrate (e.g., the image sensor may be a flip-chip integrated circuit or a packaged integrated circuit that is attached to the rear surface of the camera module substrate). As an example, the image sensor may be mounted within a recess of the camera module substrate. The camera module substrate may include an opening through which light received from the transparent window is passed to the image sensor. The camera module may include optical focusing structures mounted on the camera module substrate between the opening in the camera module substrate and the transparent window. The optical focusing structures may include one or more lenses that focus received light onto the image sensor.

A flex circuit may be used to convey image data signals and control signals between the camera module and other components such as the storage and processing circuitry. The flex circuit may be mounted to the front surface of the camera module substrate to help reduce total height of the camera module. The flex circuit may be mounted to an extended portion of the camera module substrate or may be mounted to surround the periphery of the image sensor and the optical focusing structures. Traces on the camera module substrate may electrically couple the flex circuit to the image sensor and/or the optical focusing structures.

Further features of the invention, its nature and various advantages will be more apparent from the accompanying drawings and the following detailed description of the preferred embodiments.

DETAILED DESCRIPTION

Figure 1:
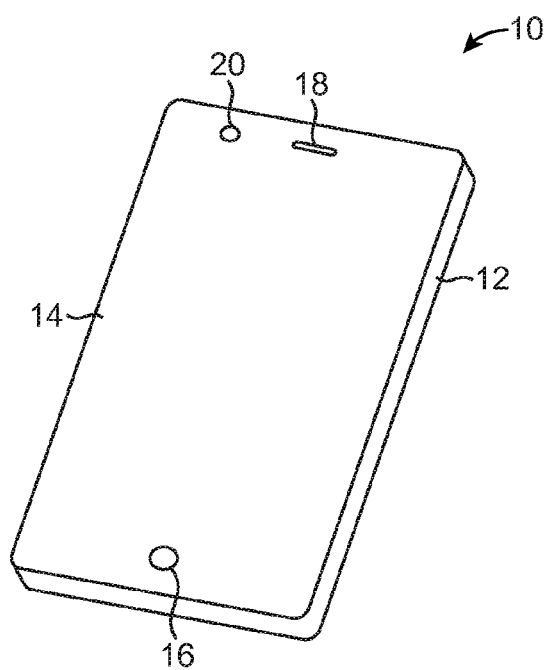
FIG. 1 is a front perspective view of an illustrative electronic device of the type that may include a camera module having a digital image sensor in accordance with an embodiment of the present invention.

Electronic devices such as electronic device 10 of FIG. 1 may be provided with camera systems. Digital images may be captured using a camera module having an image sensor. There may be any suitable number of camera modules in device 10. For example, there may be one camera module in the camera systems of device 10, there may be two camera modules in device 10, or there may be three or more camera modules in device 10 (as examples).

Device 10 of FIG. 1 may be portable electronic equipment such as a cellular telephone, a tablet computer, a media player, a wrist-watch device, a pendant device, an earpiece device, a notebook computer, other compact portable devices, or other electronic equipment such as a computer monitor with an integrated computer, a desktop computer, or a television.

Device 10 of FIG. 1 may include a housing such as housing 12. Housing 12, which may sometimes be referred to as a case or an electronic device housing, may be formed of plastic, glass, ceramics, fiber composites, metal (e.g., stainless steel, aluminum, etc.), other suitable materials, or a combination of these materials. Housing 12 may be formed from a unibody structure (e.g., a structure that is machined from a single piece of material) or may include internal frame structures and exterior wall structures (as examples). Other types of housing construction may also be used if desired.

Device 10 may, if desired, have a display such as display 14. Display 14 may be a touch screen that incorporates touch sensitive structures such as capacitive touch electrodes or display 14 may be touch insensitive. Display 14 may include image pixels formed from light-emitting diodes (LEDs), organic LEDs (OLEDs), plasma cells, electrophoretic display elements, electrowetting display elements, liquid crystal display (LCD) components, or other suitable image pixel structures. A cover layer such as a layer of glass or clear plastic may cover the surface of display 14. Buttons and speaker port openings may pass through openings in the cover glass. For example, the cover layer for display 14 may have an opening for a front-facing button such as button 16 and a speaker opening such as speaker port opening 18.

Portions of display 14 may form active regions (i.e., regions in which the image pixels of display 14 form images for a user). Portions of display 14 may also form inactive regions (e.g., peripheral portions of display 14 that to not have any active image pixels). Camera window structures such as camera window structure 20 may be provided in the cover layer for display 14 (e.g., to form a front-facing camera). The camera windows structures may be formed from transparent materials such as glass, plastic, or other transparent materials. Camera window 20 of FIG. 1 may, for example, be formed in an inactive portion of display 14. The display cover layer in the inactive portion of display 14 may be provided with an opaque masking layer such as a layer of black ink. Camera window 20 may be formed from an opening in the opaque masking layer.

Figure 2:
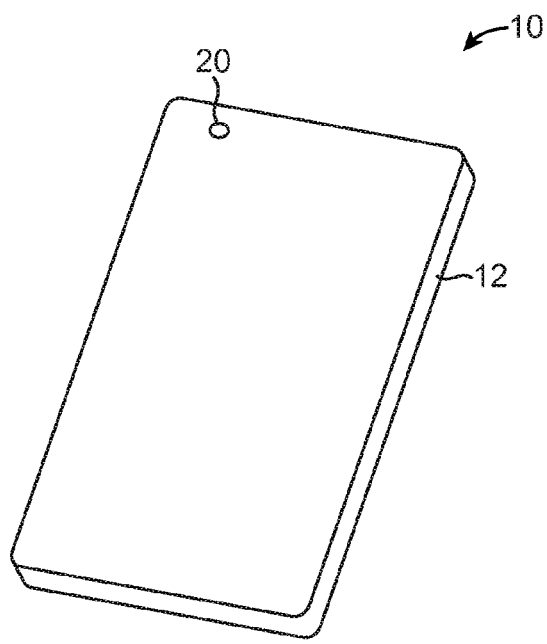
FIG. 2 is a rear perspective view of an illustrative electronic device of the type that may include a camera module having a digital image sensor in accordance with an embodiment of the present invention.

If desired, camera windows 20 may be formed elsewhere in device housing 12. As shown in the rear perspective view of device 10 of FIG. 2, camera window 20 may be formed on the rear surface of housing 12 (e.g., to form a rear-facing camera).

Figure 3:
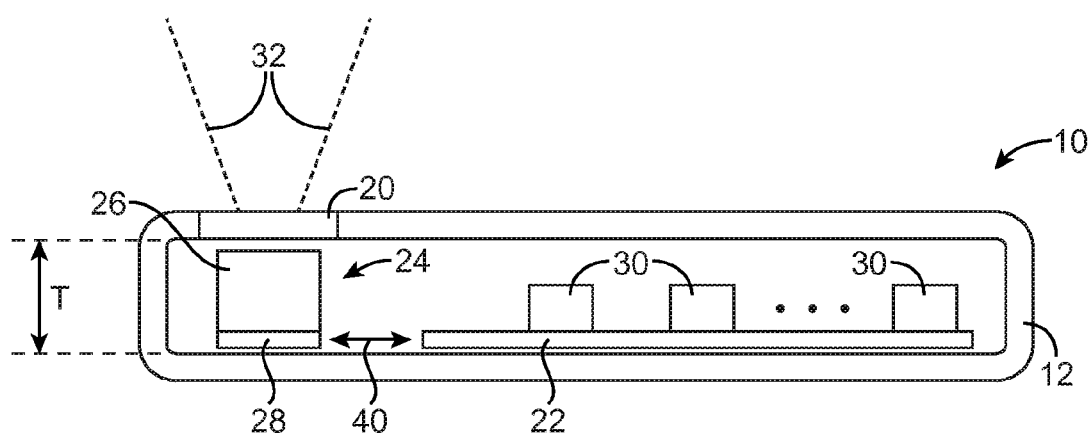
FIG. 3 is a cross-sectional side view of an illustrative electronic device containing a camera module having a digital image sensor in accordance with the present invention.

FIG. 3 is a cross-sectional side view of electronic device 10. As shown in FIG. 3, camera module 24 may include optical structures 26 and digital image sensor 28. Optical structures 26 may include lens structures (e.g., one or more lenses), focusing structures such as auto-focusing structures, filters such as infrared filters, or other optical structures. Optical structures 26 may have actuators that assist in optical focus adjustments (e.g., voice coil motors (VCMs), piezoelectric motors, direct-current motors, or other actuators). Image light 32 may pass through transparent camera window 20 in housing 12 (e.g., the display cover layer, a rear housing surface, or other portions of device 10). The received image light may be focused by optical structures 26 onto digital image sensor 28 in camera 24. Digital image sensor 28 may be a complementary metal-oxide-semiconductor (CMOS) sensor, a charge-coupled device (CCD) sensor, or other suitable image sensor capable of capturing digital images for device 10.

Device 10 may include control circuitry such as one or more microprocessors, digital signal processors, system-on-chip circuits, microcontrollers, application-specific integrated circuits, memory chips, solid state drives, removable memory devices, volatile memory circuits, non-volatile memory circuits, hard disk drives, etc. As shown in FIG. 3, control circuitry may be implemented using one or more electrical components 30 mounted to one or more substrates such as substrate 22. If desired, portions of the control circuitry may be formed as part of camera module 24. Components 30 may include integrated circuits, discrete components, sensors, connectors, battery structures, status indicator lights (e.g., light-emitting diodes), displays, input-output components, wired and wireless communications circuitry, etc. Substrate 22 may be a rigid printed circuit board (e.g., a fiberglass-filled epoxy board), a flexible printed circuit (e.g., a "flex circuit" formed from conductive traces on a flexible sheet of polymer such as polyimide), other dielectric structures, or other suitable substrate materials.

Components 30 (e.g., control circuitry) may be coupled to camera module 24 via paths 40. Paths 40 may, for example, include traces formed on a flex circuit. For example, the flex circuit may include traces formed on a flexible sheet of polymer such as polyimide (e.g., a flexible polyimide substrate). In this scenario, the traces may be used to convey image data and control signals between camera module 24 and components 30. The flex circuit may be connected to substrate 22 via a connector, by mounting the flex circuit directly to traces on substrate 22, or using desired connections.

Space may be at a premium in compact devices, so it may be desirable to form camera module 22 using a compact camera structure. As shown in FIG. 3, for example, the vertical separation T between upper and lower housing surfaces may constrain the dimensions of camera module 22. It may be challenging to provide camera modules 26 having sufficient performance when constrained by available space in compact devices. For example, optical structures 26 that are reduced in size to accommodate space constraints may provide poor optical performance.

Figure 4:
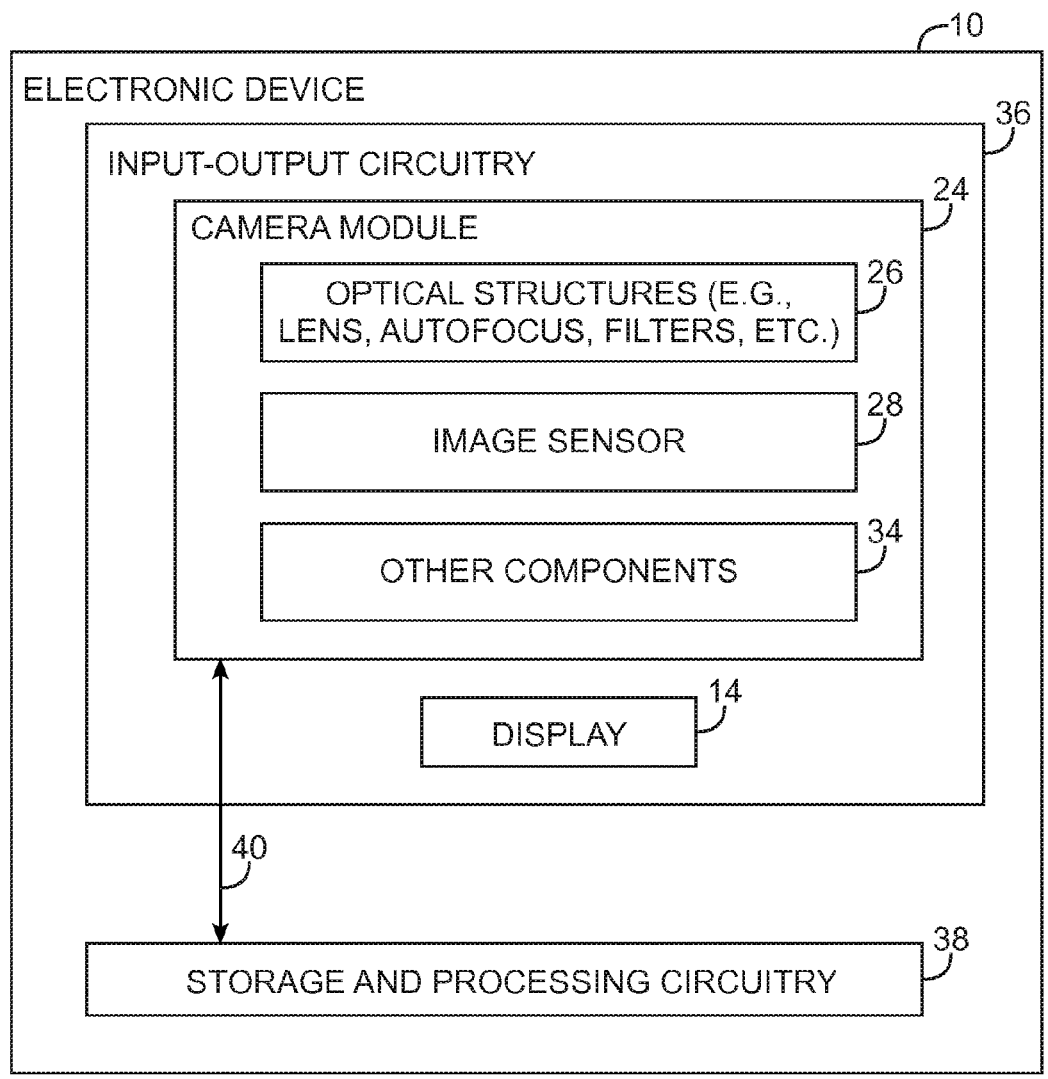
FIG. 4 is a schematic diagram of an illustrative electronic device having a camera module in accordance with an embodiment of the present invention.

A schematic diagram of an illustrative electronic device 10 having a camera module 24 is shown in FIG. 4. Camera module 24 may include optical structures 26 such as a lens, autofocus structures, filter structures, or other structures such as actuators, etc. Optical structures 26 may include one or more image sensors 28 and other components 34 such as discrete components (e.g., resistors, capacitors, etc.) or integrated circuits (e.g., driver circuits, processing circuits, etc.).

Electronic device 10 may include control circuitry such as storage and processing circuitry 38. Storage and processing circuitry 38 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 38 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 38 may be used to run software on device 10, such as image capture functions, internet browsing applications, voice-over-internet-protocol (VoIP) telephone call applications, email applications, media playback applications, operating system functions, etc. For example, storage and processing circuitry 38 may be used to perform image capture functions using camera module 24. In this scenario, storage and processing circuitry 38 may provide control signals to camera module 24 via paths 40 (e.g., paths on a flex circuit) that direct camera module 24 to capture an image using image sensor 28 and optical structures 26. Camera module 24 may subsequently provide captured image data to storage and processing circuitry 38 via paths 40. If desired, power may also be provided to camera module 24 via paths 40.

Input-output circuitry 36 may be used to allow data to be supplied to device 10 and to allow data to be provided from device 10 to external devices. Input-output circuitry 36 may include input-output devices such as camera module 24, display 14, buttons, joysticks, click wheels, scrolling wheels, touch pads, key pads, keyboards, microphones, speakers, tone generators, vibrators, sensors, light-emitting diodes and other status indicators, data ports, etc. A user can control the operation of device 10 by supplying commands through input-output circuitry 36 and may receive status information and other output from device 10 using the output resources of input-output devices 36.

Figure 5:
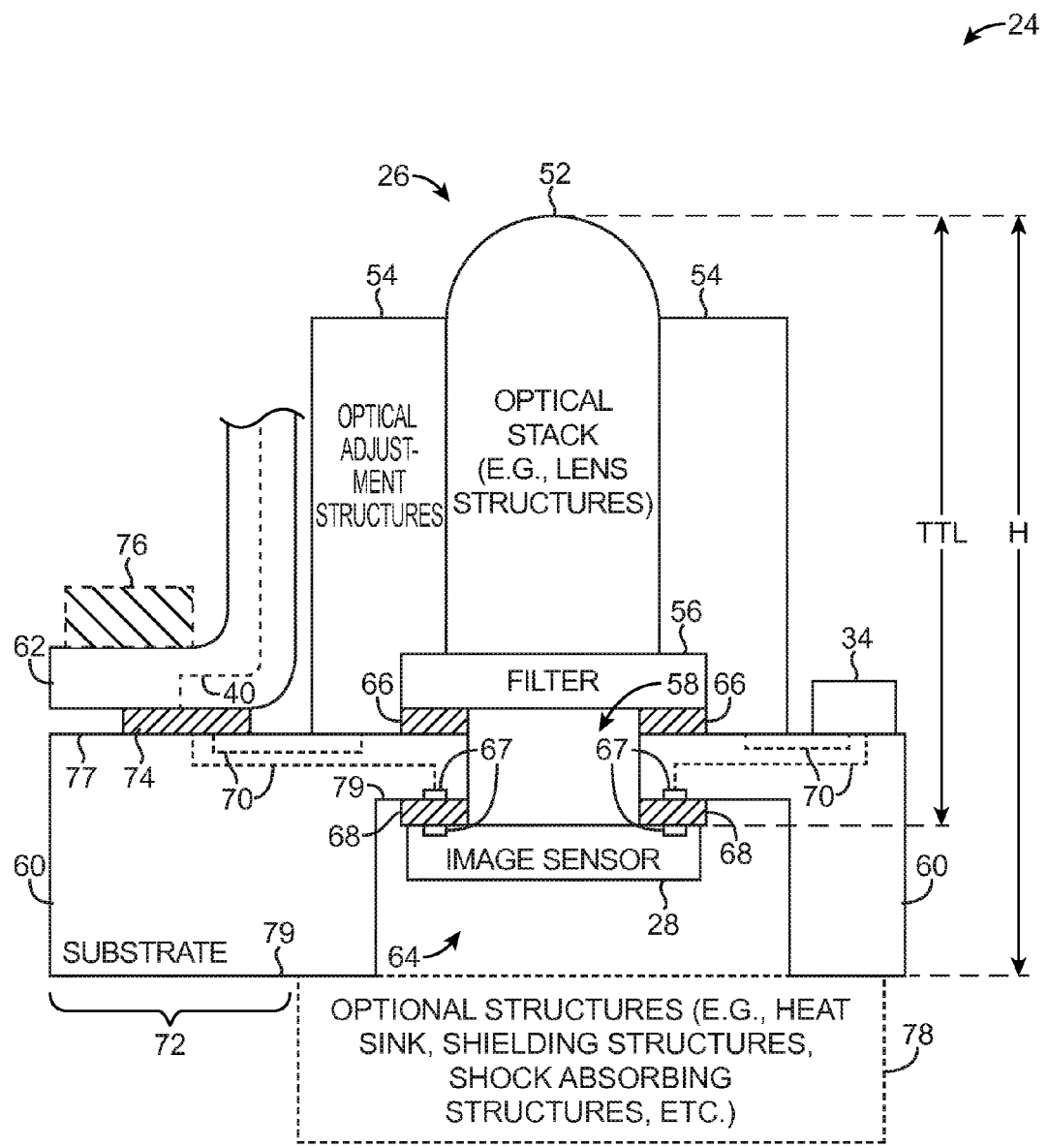
FIG. 5 is a cross-sectional side view of an illustrative camera module having an image sensor and a flex circuit mounted to a substrate in accordance with the present invention.

FIG. 5 is an illustrative cross-sectional diagram of a compact camera module 24. Camera module 24 may include optical structures 26 (e.g., optical focusing structures), image sensor 28, and one or more components 34 on substrate 60. Substrate 60 may be formed from ceramic materials and may be formed having one or more layers. For example, substrate 60 may be a high temperature co-fired ceramic (HTCC) substrate having multiple layers formed from ceramic materials such as alumina oxide. This example is merely illustrative. If desired, substrate 60 may be formed from any desired printed circuit substrate materials.

Optical structures 26 may include an optical stack 52 and corresponding optical adjustment structures 54. Optical stack 52 may include one or more lenses and may include optical focusing structures such as auto-focusing structures. Optical adjustment structures 54 may be used to adjust the focusing structures. For example, optical adjustment structures 54 may include actuators (e.g., magnetically driven linear motors such as voice coil motors or other motors) that are coupled to the focusing structures via springs. Optical adjustment structures 54 may include stabilizing structures such as shock absorbers. As examples, stabilizing structures may be formed from silicone, foam, or any desired elastomeric members to help stabilize optical stack 52 during image capture operations.

Optical structures 26 may include one or more filters such as filter 56. Filter 56 may be formed from glass or other transparent materials and may be used to filter undesired portions of incoming light that is received by optical stack 52. For example, filter 56 may be an infrared filter that removes infrared portions of incoming light while passing visible light (e.g., filter 56 may block light having wavelengths belonging to the infrared spectrum and pass light of the visible spectrum).

Optical structures 26 may be mounted over an opening 58 in substrate 60 for image sensor 28. Opening 58 may, for example, be an air-filled gap in substrate 60. Optical structures 26 may be mounted to substrate 60 over opening 58 via connections 66. Connections 66 may, for example, be formed from adhesives such as glue, polymer-based adhesives, heat-cured adhesives, or other desired adhesive materials that help seal opening 58 (e.g., from external dust particles).

Substrate 60 may include a recess 64 for accommodating image sensor 28. Image sensor 28 may be mounted to substrate 60 within recess 64 via connections 68. Connections 68 may be formed using flip-chip techniques or other desired integrated circuit mounting techniques (e.g., ultrasonic bonding). For example, connections 68 may be formed from conductive material that couples opposing conductive pads 67 on substrate 60 and image sensor 28. The conductive material and conductive pads may be formed from gold, copper, or other desired conductive materials. Connections 68 may include filler materials such as glue, liquid adhesives, heat-cured adhesives, or other desired adhesive materials. For example, insulating materials may be deposited to surround the conductive material of connections 68 so that opening 58 is sealed from external dust particles or other potentially damaging materials (e.g., to help prevent damage to image sensor 68).

Camera module 24 may include one or more components such as component 34 on substrate 60. Component 34 may, for example, be a surface-mount technology (SMT) component that is mounted to substrate 60. If desired, component 34 may include circuitry such as control circuitry or signal processing circuitry that is used to process signals associated with image sensor 28. Component 34 may be an integrated circuit component or may be a discrete component such as a resistor, capacitor, inductor, etc. Camera module 24 may include one component 34, two components 34, three components 34 or more.

Substrate 60 may include traces 70 that provide signal paths for image sensor 28, optical structures 26, flex circuit 62, and other components such as component 34. Traces 70 may be formed from conductive materials deposited on the surface of substrate 60 or on intermediate layers of substrate 60. For example, traces 70 may be formed from metals such as tungsten, copper, or other desired conductive materials. If desired, traces 70 may be coated with materials such as nickel.

Traces 70 may be used to convey signals between image sensor 28, optical structures 26, flex circuit 62, and component 34. For example, control signals may be provided to image sensor 28 from flex circuit 62 (e.g., from paths 40) via traces 70, pads 67, and connections 68. In this scenario, the control signals may direct image sensor 28 to capture an image from light focused on image sensor 28 by optical structures 26. Additional control signals may be provided via traces 70 to control optical adjustment structures 54 (e.g., from control circuitry in components such as component 34 or from flex circuit 62). The additional control signals may adjust the optical adjustment structures and optical stack to a desired configuration for focusing light onto image sensor 28. Traces 70 may subsequently be used to provide digital image data captured from the focused light by image sensor 28 to component 34 for signal processing or directly to flex circuit 62.

The vertical distance between image sensor 28 and the upper surface of optical stack 52 may be determined by optical design constraints and may sometimes be referred to as total track length (TTL). For example, optical design constraints may require that vertical distance TTL be 4.8 mm or 5.3 mm to provide satisfactory performance at focal distances greater than 10 cm. This example is merely illustrative. Optical design constraints may vary based on a desired performance level of camera module 24 (e.g., based on desired focal distances, desired image quality levels, etc.). To help accommodate optical design constraints in a compact electronic device, substrate 60 may be formed with an extended portion 72 to which flex circuit 62 is mounted.

Substrate 60 (e.g., a camera module substrate) may include opposing surfaces 77 (e.g., a front surface) and 79 (e.g., a rear surface). Front surface 77 of substrate 60 may face a camera window such as window 20 (FIG. 3). Flex circuit 62 may be mounted to front surface 77 of extended portion 72 of substrate 60 via connection 74. Connection 74 may include conductive materials that couple paths 40 of flex circuit 62 to traces 70 of substrate 60. For example, connection 74 may include conductive adhesive such as an anisotropic conductive film, conductive epoxy, etc., or a conductive connection formed from thermosonic bonding.

By mounting flex circuit 62 to front surface 77 of extended portion 72 of substrate 60 (e.g., instead of on a rear surface of substrate 60 underneath image sensor 28), total height H of camera module 24 may be reduced. In other words, total height H of camera module 24 may be independent of the thickness associated with flex circuit 62 that is mounted on front surface 77 of substrate 60. By forming camera modules 24 having reduced height H, electronic device thickness T (FIG. 3) may be reduced while maintaining optical performance (e.g., because total track length TTL of camera module 26 is maintained). Alternatively, optical performance may be improved by increasing total track length TTL of optical structures 26 while maintaining thickness T of electronic device 10.

If desired, an optional conductive layer 76 may cover a portion of flex circuit 62. Conductive layer 76 may be formed from metals or other conductive materials and may be attached to flex circuit 62 via thermal bonding film, epoxy, or other adhesive materials. Conductive layer 76 may be a rigid layer that helps to protect the portion of flex circuit 62 that is coupled to substrate 60. For example, conductive layer 76 may be formed from a rigid metal sheet that provides structural support for flex circuit 62. If desired, conductive layer 76 may serve as a ground plane for flex circuit 62, as an electromagnetic shielding layer, and/or as a heat sink. For example, conductive layer 76 may serve as a shielding layer that helps to protect connection 74 and traces 40 and 70 from electromagnetic interference (e.g., electromagnetic interference generated from external circuitry such as components 30 of device 10). As another example, conductive layer 76 may serve as heat sink structure that tends to spread heat away from potentially heat-producing structures such as connections 74. If desired, multiple layers 76 may be formed. For example, a heat sink structure may be combined with a shielding structure and/or a ground plane structure.

Circuitry such as image sensor 28 tends to produce heat during normal operation (e.g., during image capture operations). By forming flex circuit on extended portion 72 of substrate 60, image sensor 28 and recess 64 of substrate 60 may be exposed and heat radiating from image sensor 28 may be conducted away from sensor 28. If desired, optional structures 78 such as a heat sink or heat spreader structure may be used to cover recess 64 and help maintain image sensor 28 at desired operating temperatures. For example, a heat sink formed from metal or other thermally conductive materials may be used to cover recess 64. Optional structures 78 may include an electromagnetic shielding layer (e.g., a shielding layer formed from conductive materials) for shielding image sensor 28. Optional structures 78 may include shock absorbing structures such as foam, silicone, or other elastomeric structures that help to stabilize camera module 24. If desired, optional structures 78 may include any desired combination of shielding structures, shock absorbing structures, and heat sink structures. For example, a heat sink structure covering image sensor 28 may be attached to rear surface 72 of substrate 60 and covered with a shielding layer of metal and a layer of foam.

Figure 6:
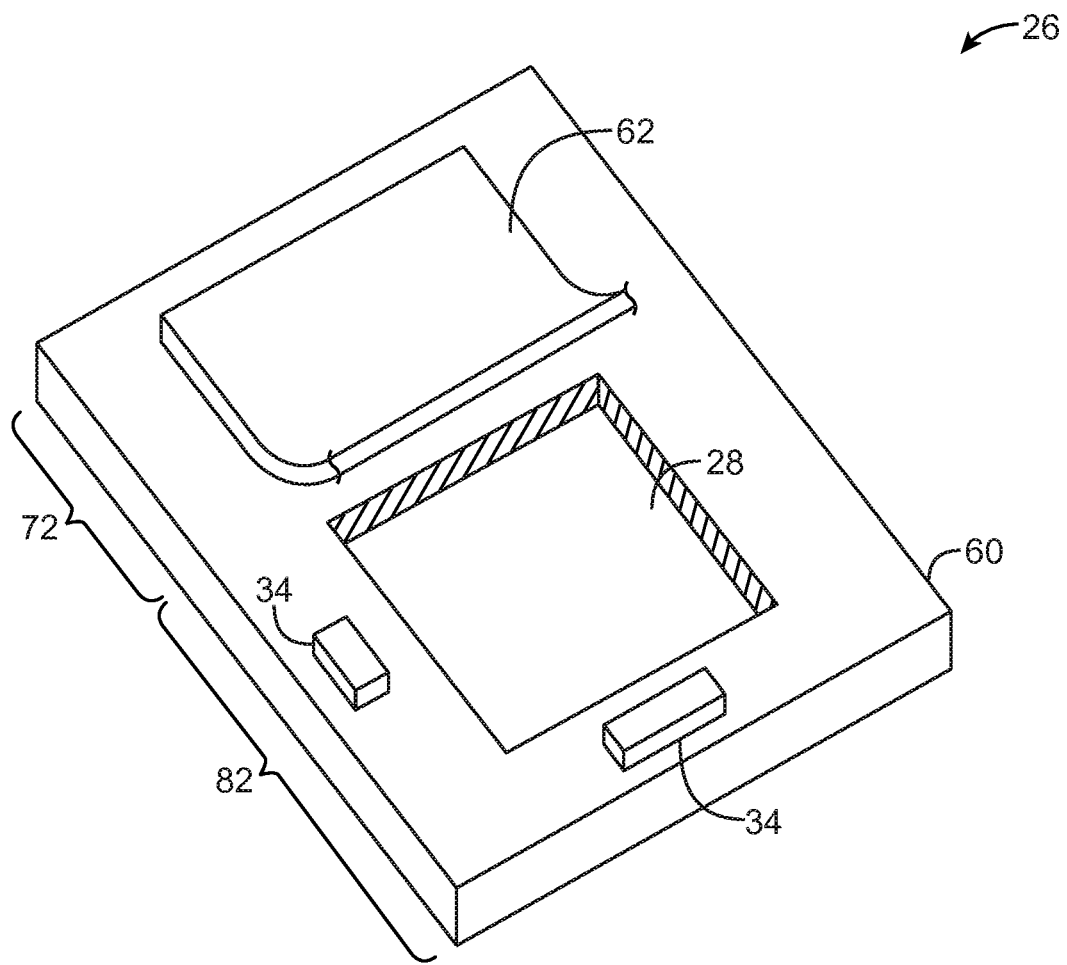
FIG. 6 is an illustrative perspective view of a flex circuit mounted on an extended portion of a camera module substrate in accordance with the present invention.

FIG. 6 is a perspective view of substrate 60 having an extended portion 72 to which flex circuit 62 is mounted. Image sensor 28 may be mounted in a recess within central portion 82 of substrate 60. Components 34 may be mounted on central portion 82 or, if desired, on portion 72 of substrate 60. In the example of FIG. 6, flex circuit 62 covers part of extended portion 72. However, flex circuit 62 may be configured to cover all of extended portion 72 or may cover some of portion 82 of substrate 60 (if desired).

Figure 7:
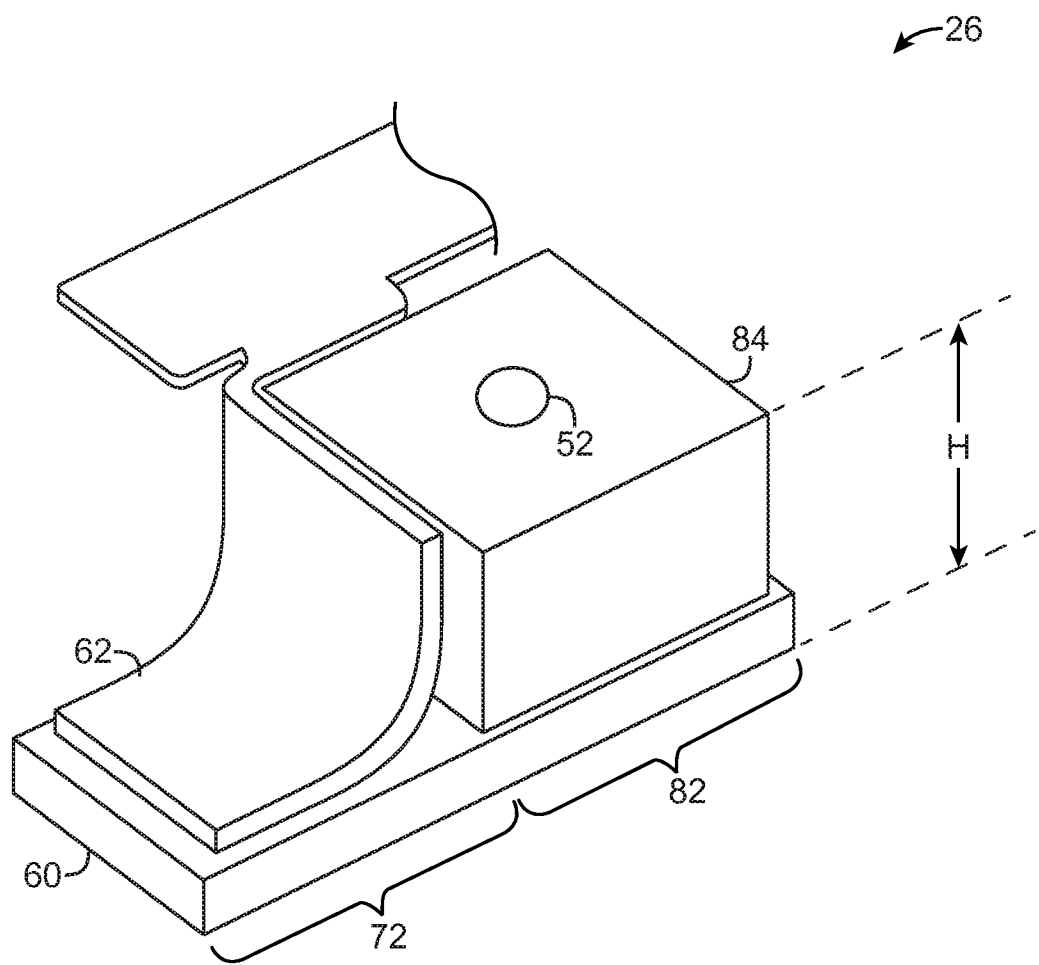
FIG. 7 is a perspective view of an illustrative camera module having a flex circuit that is wrapped around an optical housing structure in accordance with the present invention.

As shown in FIG. 7, camera module 26 may include a housing 84. Housing 84 may cover and surround optical structures 26 and/or components 34 (FIG. 5). Housing 84 may include an opening that accommodates optical stack 52 (e.g., so that light may reach image sensor 28 through optical stack 52). Housing 84 may be formed from any desired housing materials similar to electronic device housing 12. Flex circuit 62 may be wrapped around housing 84 and coupled to other components of electronic device 10 to provide a slim profile. Flex circuit 62 that is wrapped around camera module 84 may sometimes be referred to herein as a wrapped flex circuit and may help to help reduce the overall dimensions of camera module 26.

Figure 8A:
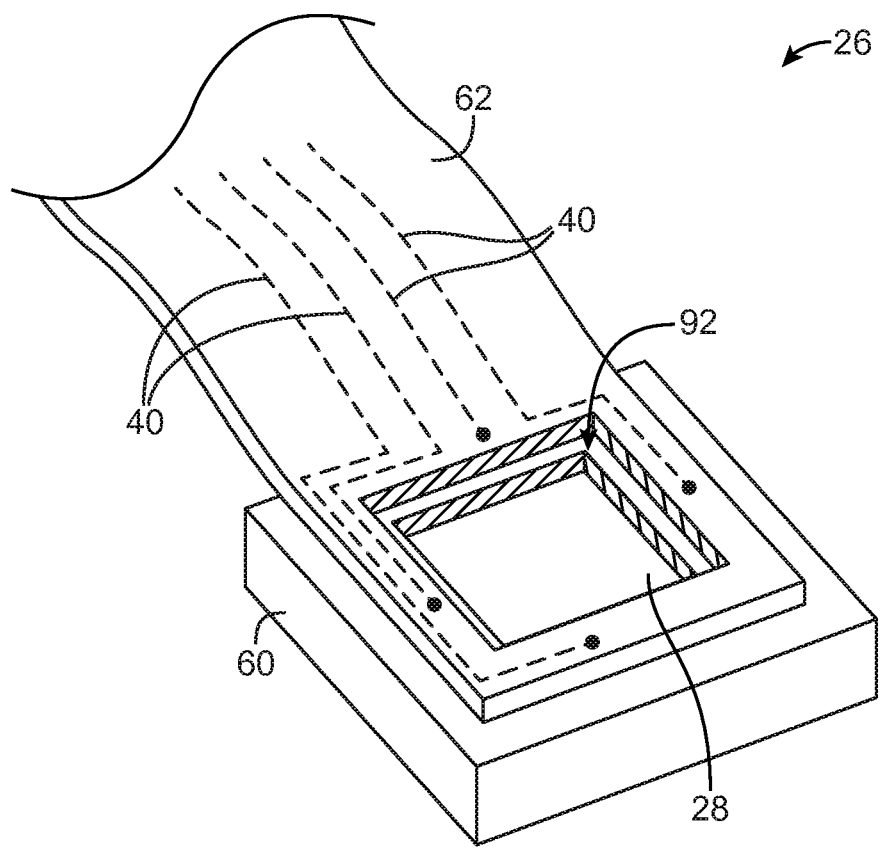
FIG. 8A is an illustrative perspective view of a flex circuit that is mounted to a substrate and surrounds the periphery of an image sensor in accordance with the present invention.

If desired, flex circuit 62 may be coupled to substrate 60 along the periphery of image sensor 28 as shown in FIG. 8A. In the example of FIG. 8A, flex circuit 62 may include an opening 92 that surrounds image sensor 28. Flex circuit 62 may be coupled to substrate 60 along the periphery of opening 92 via connections similar to connections 74 of FIG. 5 (e.g., anisotropic conductive film, conductive adhesives, etc.). For example, traces 40 on flex circuit 62 may be coupled to corresponding traces on substrate 60 such as traces 70 (FIG. 5) along the periphery of opening 92 using anisotropic conductive film. By forming a flex circuit 62 that surrounds image sensor 28, the footprint of camera module 26 may be reduced (e.g., because it may not be necessary to form substrate 60 having an extended portion).

Figure 8B:
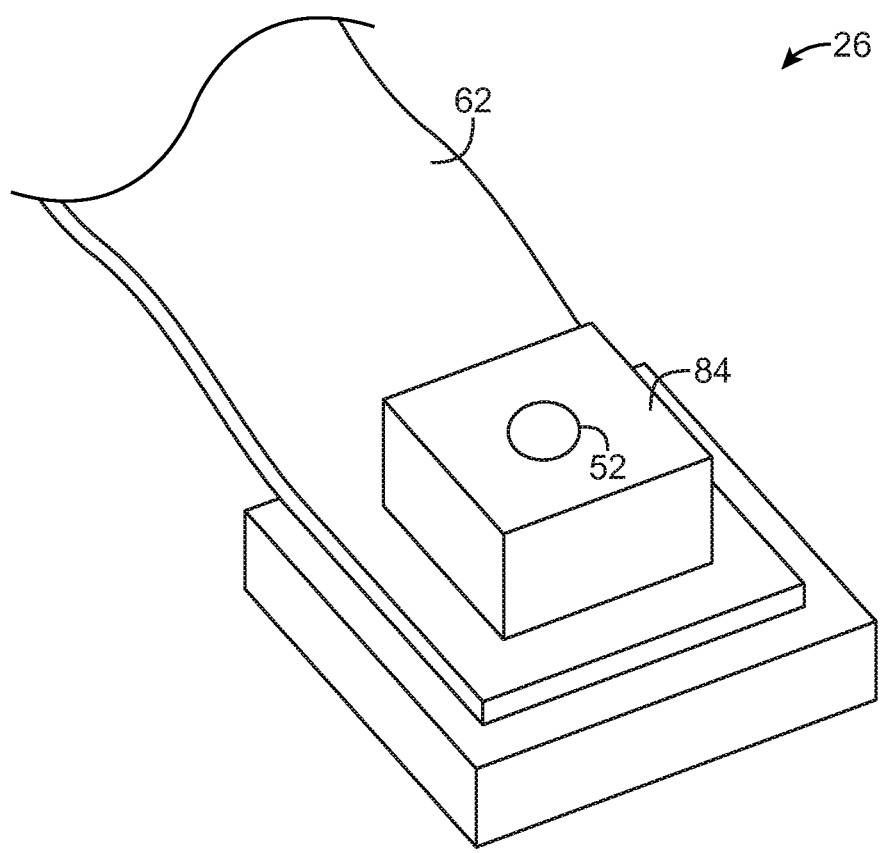
FIG. 8B is an illustrative perspective view of a flex circuit that is mounted to a substrate and surrounds the periphery of an optical housing structure that covers an image sensor in accordance with the present invention.

FIG. 8B is a perspective view of camera module 26 having flex circuit 62 with an opening such as opening 92 of FIG. 8A. As shown in FIG. 8B, the opening in flex circuit 62 may accommodate housing 84 and optical stack 52. Flex circuit 62 may extend and couple to other components of electronic device 10.

Figure 9:
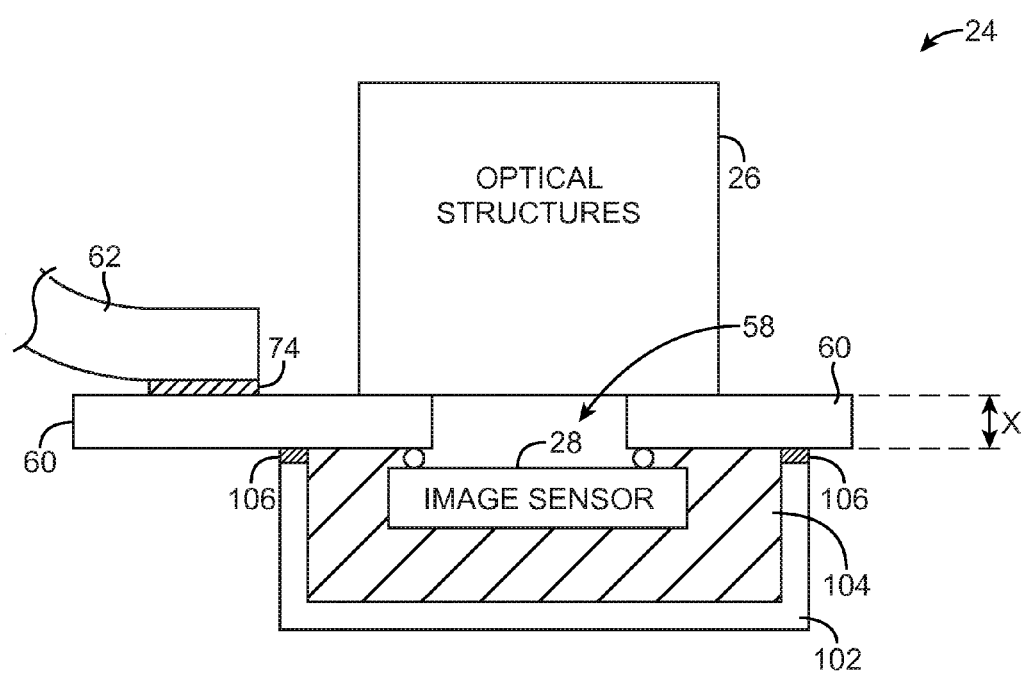
FIG. 9 is an cross-sectional view of an illustrative camera module having a flex circuit and an image sensor mounted to a substrate of uniform thickness in accordance with the present invention.

It may be challenging to form recesses in a camera module substrate for accommodating image sensors. For example, recess 64 of substrate 60 as shown in FIG. 5 may add cost and complexity to substrate manufacturing processes. By attaching flex circuit 62 to a front surface of camera module substrate 60, substrate 60 may be formed without an image sensor recess (e.g., as a uniform planar substrate). FIG. 9 is a cross-sectional view of an illustrative camera module 24 having substrate 60 of uniform thickness X. As shown in FIG. 9, image sensor 28 may be mounted to substrate 60 over opening 58 (e.g., similarly to image sensor 28 of FIG. 5).

Protective structure 102 may cover image sensor 28 and help to protect image sensor 28 (e.g., from accidental contact that may damage image sensor 28). Protective structure 102 may be formed from any desired material such as plastic or metal. Protective structure 102 may be attached to substrate 60 via adhesive 106 (e.g., glue, liquid adhesive, heat-cured adhesive, etc.).

Gap 104 may separate protective structures 106 from image sensor 28. Gap 104 may be an air-filled gap. If desired, gap 104 may be filled with thermally conductive materials or other materials. Thermally conductive materials used to fill gap 104 may include thermally conductive plastics or other thermally conductive materials that help to draw heat away from image sensor 28.

The foregoing is merely illustrative of the principles of this invention and various modifications can be made by those skilled in the art without departing from the scope and spirit of the invention. Any of the foregoing embodiments may be used alone or in combination with one or more of any of the other foregoing embodiments.

What is claimed is:
1. A camera module, comprising:
   a substrate having front and rear surfaces and an opening that extends between the front and rear surfaces of the substrate;
   an image sensor on the rear surface of the substrate, wherein the image sensor covers the opening in the substrate; and
   a flexible printed circuit mounted to the front surface of the substrate.

2. The camera module defined in claim 1 wherein the substrate includes a recess and wherein the image sensor is mounted to the substrate within the recess.

3. The camera module defined in claim 2 further comprising:
optical focusing structures having at least one lens on the front surface of the substrate, wherein optical focusing structures are configured to focus light onto the image sensor through the opening in the substrate.

4. The camera module defined in claim 3 further comprising:
a housing structure on the front surface of the substrate, wherein the housing structure surrounds the optical focusing structures and wherein the flexible printed circuit is wrapped around at least a portion of the housing structure.

5. The camera module defined in claim 2 further comprising:
a heat sink on the rear surface of the substrate that covers the image sensor and the recess.

6. The camera module defined in claim 2 further comprising:
an electromagnetic shielding layer on the rear surface of the substrate that covers the image sensor and the recess.

7. The camera module defined in claim 2 further comprising:
a shock absorber structure on the rear surface of the substrate that covers the image sensor and the recess.

8. The camera module defined in claim 2 further comprising a rigid metal support structure that covers a portion of the flexible printed circuit.

9. The camera module defined in claim 7 further comprising an electromagnetic shielding layer that covers a portion of the flexible printed circuit.

10. The camera module defined in claim 1 wherein the substrate comprises a ceramic substrate.

11. The camera module defined in claim 1 wherein the substrate includes traces that electrically couple the flexible printed circuit to the image sensor through the substrate.

12. The camera module defined in claim 1 wherein the flexible printed circuit is attached to the front surface of the substrate by anisotropic conductive film.

13. The camera module defined in claim 1 further comprising:
a surface-mount technology electrical component mounted to the front surface of the substrate.

14. The camera module defined in claim 1 wherein the flexible printed circuit surrounds the opening in the substrate.

15. An electronic device comprising:
an electronic device housing having a transparent window;
a substrate;
optical focusing structures mounted to the substrate;
a flexible printed circuit mounted to the substrate adjacent to the optical focusing structures, wherein the substrate has front and rear surfaces, wherein the optical focusing structures and the flexible printed circuit are mounted to the front surface of the substrate, and wherein the front surface of the substrate faces the transparent window;
an image sensor mounted to the rear surface of the substrate, wherein the substrate includes a central portion having a recess and an extended portion, wherein the image sensor is mounted to the substrate within the recess of the central portion of the substrate and wherein the flexible printed circuit is mounted to the extended portion of the substrate.

16. The electronic device defined in claim 15 wherein the substrate comprises a ceramic substrate, the electronic device further comprising:
a printed circuit board, wherein the flexible printed circuit is connected to the printed circuit board; and
control circuitry on the printed circuit board, wherein the flexible printed circuit conveys control and data signals between the image sensor and the control circuitry.

17. The electronic device defined in claim 15 wherein the substrate includes an opening that extends between the front and rear surfaces of the substrate, wherein the optical focusing structures are mounted on the front surface of the substrate between the transparent window and the opening in the substrate, wherein the image sensor is mounted on the rear surface of the substrate over the opening and wherein the optical focusing structures are configured to focus light from the transparent window onto the image sensor through the opening in the substrate.

18. The electronic device defined in claim 15 wherein the substrate comprises a high temperature co-fired ceramic substrate.

19. An electronic device camera module, comprising:
a substrate having opposing first and second surfaces;
a flexible printed circuit mounted to the first surface of the substrate;
an image sensor mounted to the second surface of the substrate; and
a protective structure mounted to the second surface of the substrate, wherein the protective structure covers and surrounds the image sensor.

20. The electronic device camera module defined in claim 19 wherein the substrate has uniform thickness.

21. The electronic device camera module defined in claim 20 wherein the protective structure is separated from the image sensor by a gap, the electronic device camera module further comprising:
thermally conductive material that fills the gap between the protective structure and the image sensor.

22. The electronic device camera module defined in claim 19 wherein the substrate includes traces that convey image data signals and control signals between the flexible printed circuit and the image sensor.

* * * * *